United States Patent
Yli-Koski

(10) Patent No.: US 8,465,002 B2
(45) Date of Patent: Jun. 18, 2013

(54) VALVE

(75) Inventor: Esko Yli-Koski, Kerava (FI)

(73) Assignee: Metso Automation Oy, Helsinki (FI)

( * ) Notice: Subject to any disclaimer, the term of this patent is extended or adjusted under 35 U.S.C. 154(b) by 580 days.

(21) Appl. No.: 12/524,391

(22) PCT Filed: Mar. 4, 2008

(86) PCT No.: PCT/FI2008/050103
§ 371 (c)(1),
(2), (4) Date: Aug. 17, 2009

(87) PCT Pub. No.: WO2008/107519
PCT Pub. Date: Sep. 12, 2008

(65) Prior Publication Data
US 2010/0213400 A1    Aug. 26, 2010

(30) Foreign Application Priority Data
Mar. 5, 2007   (FI) .................... 20075156

(51) Int. Cl.
*F16K 5/10*   (2006.01)
(52) U.S. Cl.
USPC ............ 251/209; 251/310; 251/312; 251/314
(58) Field of Classification Search
USPC ............ 251/209, 310, 312, 314; 137/625.47, 137/451
See application file for complete search history.

(56) References Cited

U.S. PATENT DOCUMENTS

| 402,957 | A | * | 5/1889 | Medrick | 210/422 |
|---|---|---|---|---|---|
| 1,048,635 | A | * | 12/1912 | Allerding | 251/209 |
| 1,138,613 | A |  | 5/1915 | Arndt |  |
| 2,346,052 | A |  | 4/1944 | Seamark |  |
| 2,639,882 | A |  | 5/1953 | Conrad |  |
| 3,910,554 | A |  | 10/1975 | Speedie |  |
| 3,974,869 | A | * | 8/1976 | Abe et al. | 251/309 |
| 4,564,044 | A | * | 1/1986 | Biller et al. | 137/625.24 |
| 4,747,578 | A | * | 5/1988 | Kivipelto et al. | 251/159 |
| 4,854,545 | A | * | 8/1989 | Pezzarossi | 251/310 |

FOREIGN PATENT DOCUMENTS

| GB | 124984 | 4/1919 |
|---|---|---|
| GB | 1170416 | 11/1969 |

* cited by examiner

*Primary Examiner* — John K Fristoe, Jr.
*Assistant Examiner* — Jessica Cahill
(74) *Attorney, Agent, or Firm* — Oliff & Berridge, PLC

(57) ABSTRACT

The invention relates to a valve comprising a housing and a closing member arranged in the housing, from which member a shaft protrudes via which the closing member is rotatable in the housing. In order to provide a working and easy-to-use valve, the closing member comprises a sector closing the opening, a flexible sector having a thinner wall than the closing sector, a guiding sector having the same radius (R) as the inner surface of the housing wall, and an open sector.

10 Claims, 3 Drawing Sheets

VALVE

FIELD OF THE INVENTION

The present invention relates to a valve, and particularly to a solution providing a working and easy-to-use valve.

DESCRIPTION OF PRIOR ART

From the prior art, a valve is known which comprises a cylindrical housing whose wall has an opening for forming a connection between the housing and the flow channel and which is provided with a cylindrically shaped closing member. In this known solution, the cylindrical closing member is dimensioned in such a way that its diameter is greater than the inner diameter of the housing. Thus, when installed in place, the closing member arranged in the housing is pressed against the wall of the housing. However, to achieve a working and easy-to-use valve, this kind of closing member-housing combination that remains in a significant strain state is not a good solution.

SUMMARY OF THE INVENTION

An object of this invention is to solve the above problem and to provide a solution with which a working and easy-to-use valve can be obtained. This object is achieved with a valve according to claim 1.

The invention utilizes a closing member having a flexible sector and an open sector which enable, in cooperation, deformation of the closing member without significant force, if required. When such a solution utilizes a guiding sector that positions the closing member relative to the housing in order to place the closing sector at the precisely correct point, a structure is obtained that is capable of closing the flow channel with sufficient tightness and that has no significant strain states between the valve parts. The result is thus a working and easy-to-use valve.

Preferred embodiments of the valve according to the invention are disclosed in the dependent claims.

BRIEF DESCRIPTION OF THE FIGURES

In the following, the invention will be described in greater detail by way of example, referring to the attached figures, of which.

DESCRIPTION OF AT LEAST ONE EMBODIMENT

Figure 1:
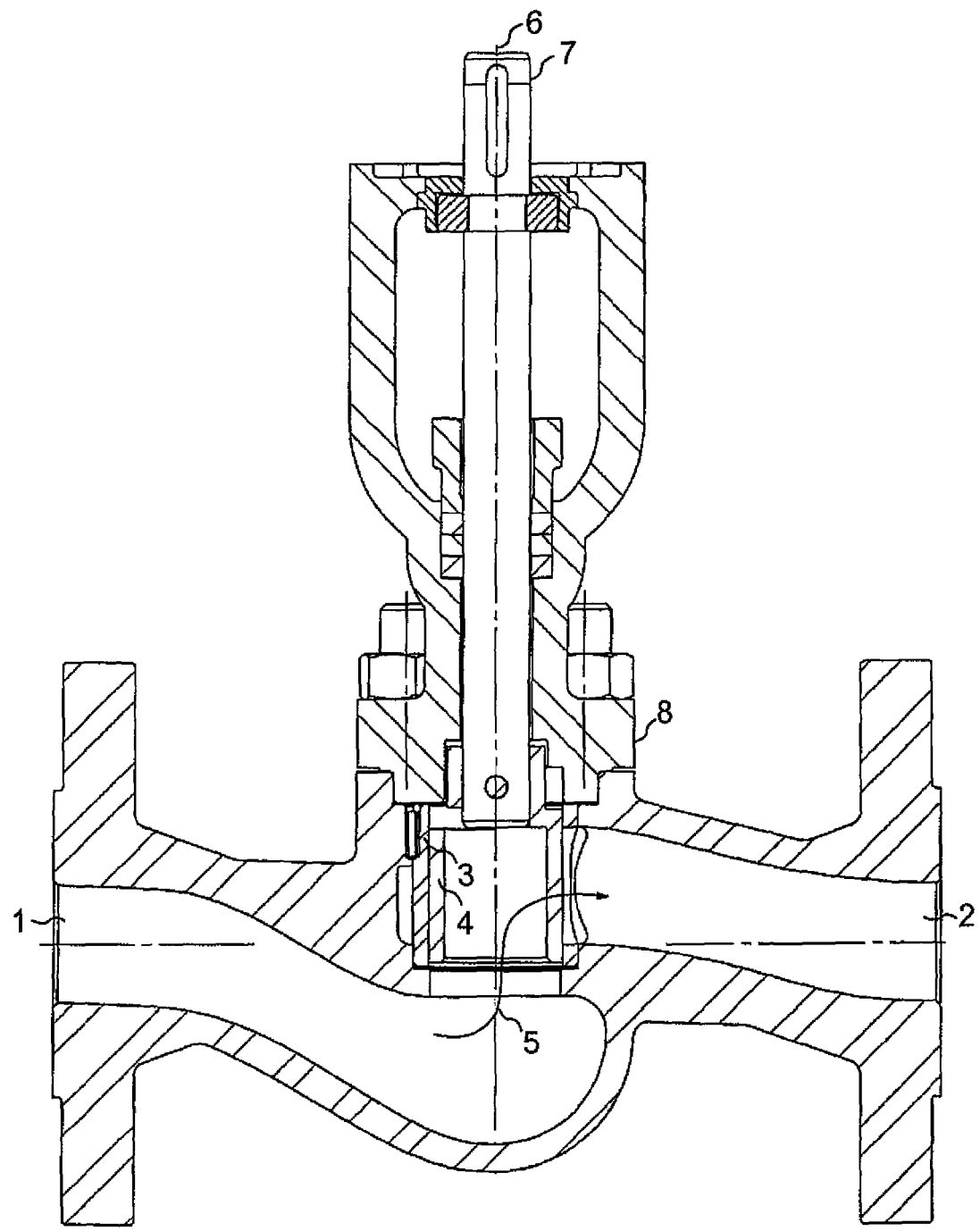
FIG. 1 illustrates an embodiment of the valve according to the invention.

It is assumed in an exemplary manner that the case of FIG. 1 involves a control valve whose cylindrical housing 3 connects a first part 1 of the flow channel and a second part 2 of the flow channel to each other.

When a closing member 4 arranged in the housing is in a position allowing flow, the flow takes place in the direction of flow illustrated by arrow 5 from the first part 1 of the flow channel, from the open bottom of the cylindrical housing 3 to the housing, and thereafter through an opening in the wall of the housing 3 to the second part 2 of the flow channel. When the closing member 4 is in a position preventing flow, the closing member 4 is pressed, due to the pressure of a flowing medium, against the wall of the housing 3 and the opening in it. This pressing contributes to the tightness.

The closing member 4 arranged in the housing 3 is rotatable around an axis of rotation 6 via a shaft 7 attached to the closing member 4. The shaft 7 is bearing-mounted on the valve.

Figure 2:
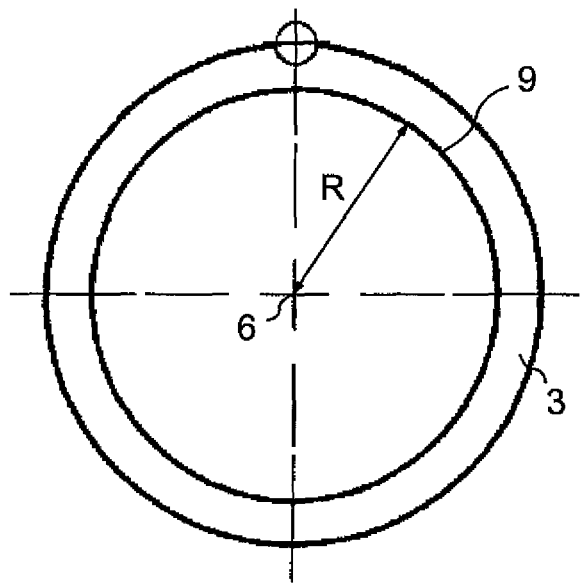
FIGS. 2 and 3 illustrate a housing used in the valve of FIG. 1.
Figure 3:
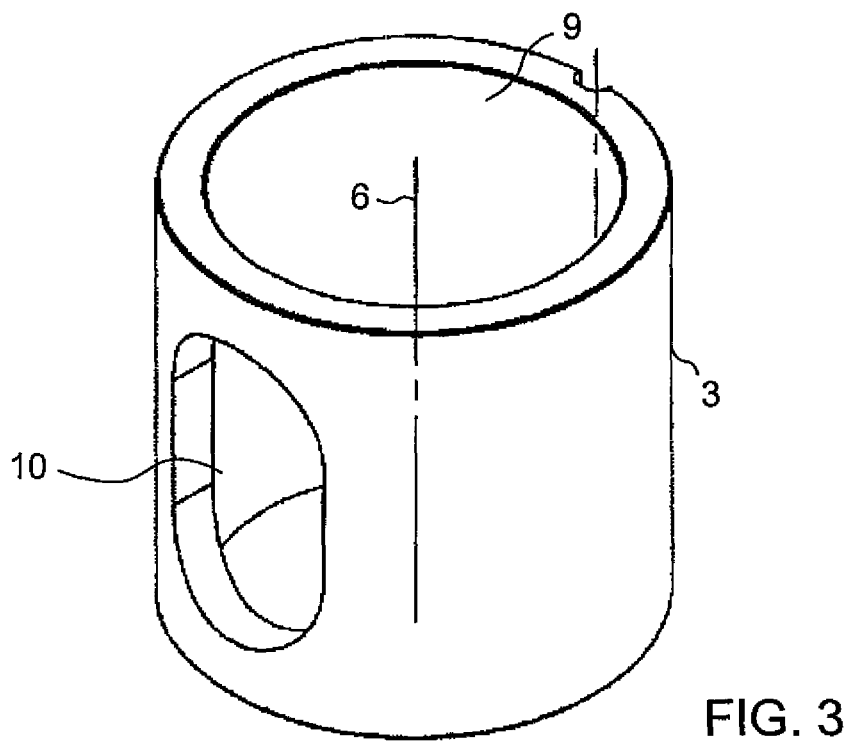

FIGS. 2 and 3 illustrate the housing 3 used in the valve of FIG. 1. In this embodiment, it is assumed in an exemplary manner that the valve utilizes a separate cylindrical sleeve as the housing 3. FIG. 2 shows a top view of the housing 3, whereas FIG. 3 is a three-dimensional view of the housing 3.

The sleeve serving as the housing 3 is sealingly attached to the valve by its end surfaces in such a way that a valve cover 8 and the shaft 7 (in FIG. 1) close the upper end of the sleeve shown in the figures, while the lower end seen in the figures remains open in the first part 1 of the flow channel.

The inner surface 9 of the wall of the housing 3 rotates around its mid-axis 6 with radius R. The wall of the cylindrical housing 3 is solid, except for an opening 10 allowing the medium flowing in the housing to flow to the second part 2 of the flow channel when the closing member is in a position allowing flow.

Figure 4:
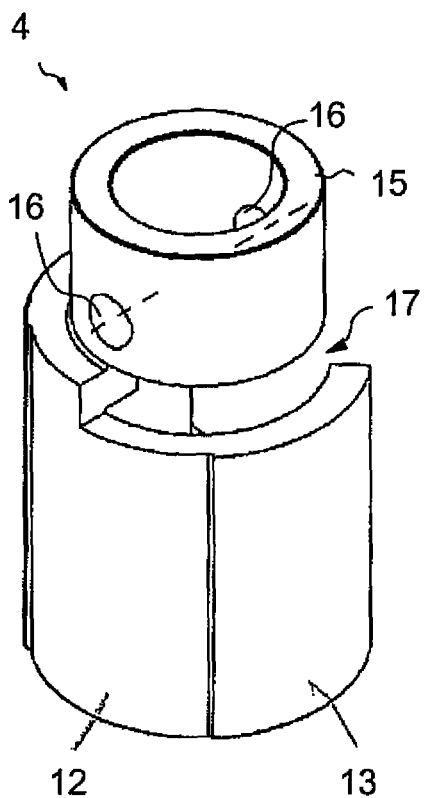
FIGS. 4, 5 and 6 illustrate a closing member used in the valve of FIG. 1.
Figure 5:
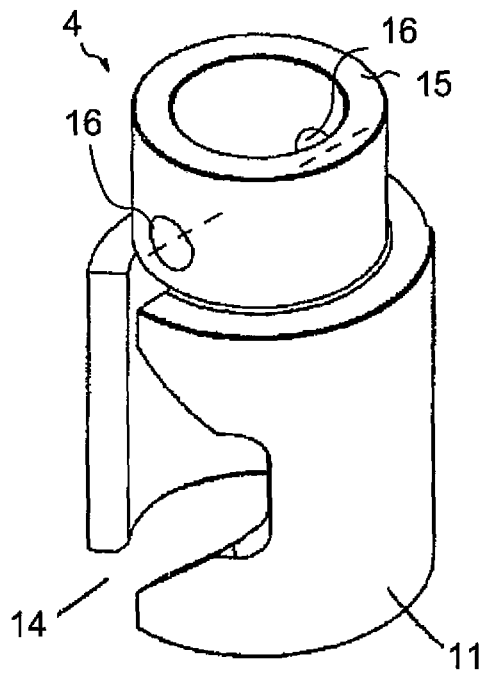
Figure 6:
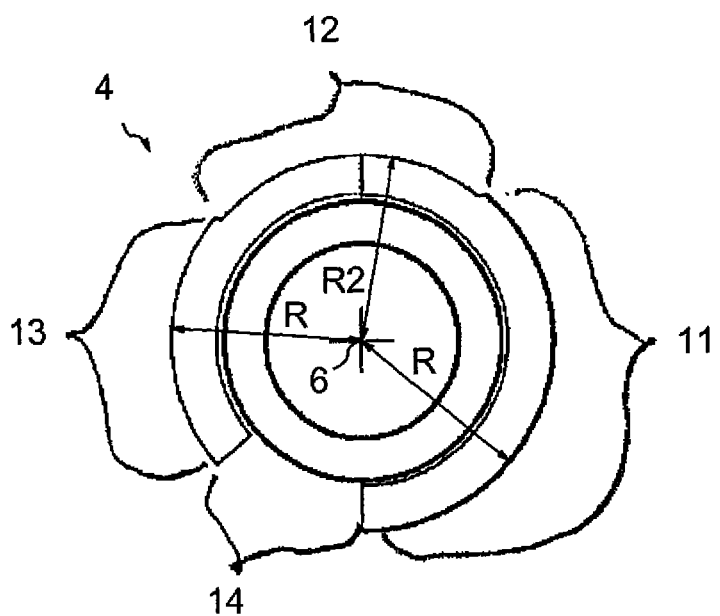

FIGS. 4, 5 and 6 illustrate a closing member 4 used in the valve of FIG. 1. In FIGS. 4 and 5 the closing member is shown three-dimensionally and in FIG. 6 from above, seen from the direction of the axis 6.

The closing member 4 is divided into sectors. Since the housing is cylindrical in the example of the figures, this example also has a closing member with cylindrical sectors. In this embodiment, the closing member 4 comprises a sector 11 covering the flow opening, a flexible sector 12, a guiding sector 13 and an open sector 14. The closing member is attachable to the valve shaft 7 via an attaching part 15 in such a way that the end of the shaft is passed into the annular attaching part and after this attached to place with a pin to be passed through openings 16. However, in accordance with the invention, it is also feasible to use a structure in which the closing member and the shaft are of the same piece and not separate parts as in the example of the figures. Such a structure is advantageous in the sense that it allows the problem relating to the joint of the closing member and the shaft as regards parallelism and concentricity to be avoided.

The closing sector 11 shuts off the flow through the valve when the closing member 4 is turned into a position in which the closing sector covers the opening 10 in the wall of the housing 3.

The flexible sector 12 is delimited by the closing sector 11 and has a thinner wall than the closing sector. This makes the required flexibility properties possible without a need to use in the flexible sector 12 material deviating from the other cylindrical sectors of the closing member. In the example of the figures, radius R2 of the outer surface of the flexible sector 11 is smaller than radius R of the outer wall of the closing sector.

The guiding sector 13 is delimited by the flexible cylindrical sector 12.

The open sector 14 allows the flowing medium to flow unrestrictedly through the valve when the closing member 4 is turned into a position in which the open sector 14 is positioned at the point of the opening 10 of the housing 3. The open sector 14 also allows the closing member 4 to yield.

It is seen from FIGS. 4 and 5 that the attaching part 15 formed in the closing member for receiving the shaft is attached to at least the closing sector 11 of the closing member. The attaching part is thus attached (in this example) to the end of the cylindrical closing member. In the case of the figures, the attaching part 15 may also be partly attached to the flexible sector 12. However, a slot 17 is arranged between the guiding sector 13 and the attaching part 15 in order for the attaching part 15 to be separated from the guiding sector 13. This slot 17 contributes to the flexibility of the closing member. Owing to the slot, the guiding sector 13 can yield relative to the closing sector 11 with a significantly smaller force than in a case where the attaching part 15 would also be attached to the guiding sector 13.

If the shaft and the closing member are of the same piece, the shaft is preferably attached as described above with reference to the attaching part 15. Thus, the shaft is attached to at least the closing sector, and it is separated from the guiding sector with a slot.

It is seen from FIG. 6 that the guiding cylindrical sector 13 and the closing cylindrical sector 11 are opposite relative to the axis of rotation 6, and the size of both of them is under half of the circumference of the whole closing member 4.

Thanks to the above flexible structure it can be ensured that the guiding sector 13 coming into contact with the wall 9 of the housing positions the closing member 4 precisely at the desired point in the housing, whereby also the closing sector 11 becomes placed precisely at the desired point in such a way that the closing sector 11 closes the opening 10 with sufficient tightness by pressing against the wall of the housing at the point of the opening 10. If required, the tightness can be improved even more by arranging seal material around the edges of the opening 10, on the inner surface 9 and/or on the outer surface of the closing sector 11. Suitable seal material is sold under trade name TEFLON, for example.

In accordance with the invention, the closing member can be manufactured in such a way that the radius of the outer surface of the sector 11 is the same as radius R of the inner surface 9 of the wall of the housing 3. Also the radius of the outer surface of the guiding sector 13 may be the same as radius R of the inner surface 9 of the housing wall, in which case the tightness is the most efficient possible. However, if sufficient tightness can be achieved in another way, the radius of the outer surface of the guiding sector 13 may slightly deviate from the radius of the inner surface 9 of the housing wall.

If the outer surface of the closing sector and the outer surface of the guiding sector have the same radius as the inner surface of the housing wall, the housing 3 and the closing member 4 may be placed within each other also when the tolerances of the diameters cause a press fit. The tolerance needs not be, however, set such that the diameter of the outer surface of the closing member is smaller than the inner diameter of the housing but a working valve is also provided when the tolerances are opposite, in other words when the diameter of the outer surface of the closing member is larger than the inner diameter of the housing. In such a case, the open sector 14 and the flexible sector 12 allow small reciprocal movement of the closing sector 11 and guiding sector 13 without there remaining significant strain states affecting the operation. The structure also allows diameter variations due to temperature differences.

In connection with the installation, the closing member 4 guides the sleeve functioning as the housing 3 to be concentric and parallel to the closing member. The closing member becomes thus positioned at the precisely desired point relative to the housing. Owing to the structure of the closing member 4, the sealing surfaces are in continuous contact, whereby the sharp edges of the surfaces of the closing member 4 scrape out the particles possibly stuck on the sealing surface that could, when getting between the surfaces, prevent the sealing. The continuous contact due to the flexibility of the closing member 4 ensures the sealing also with small pressure differences over the closing member 4, whereby the sealing is at its most efficient when such a housing and closing member are used that have the same diameter as the inner surface of the housing.

As described above with reference to the figures, the closing member comprises a closing sector, a flexible sector, a guiding sector and an open sector in this order. In accordance with the invention it is, however, feasible that the order of the sectors is deviating or that one or more of the above-mentioned sectors are formed of sectors with guiding edges, joined together by a flexible sector between them.

With reference to the figures, it has also been described that the housing 4 is cylindrical and that the sectors 11, 12 and 13 are cylindrical sectors. However, it is also feasible in accordance with the invention that the shape of the housing and the sectors is not cylindrical but something else. One alternative is thus to utilize a conical housing, such as a housing formed of a sleeve of the shape of a truncated cone. Thus, the outer surface of the closing sector may have the same radius as the inner surface of the housing wall at the height corresponding to each other, when moving in the direction of the axis of rotation. The diameter of the housing and the closing sector thus increases correspondingly. Hence, the diameter of the outer surface of the guiding sector may also correspond to the diameter of the inner surface of the housing wall at the height corresponding to each other, if the intention is to provide a housing and a closing member having the same diameter.

It is to be understood that the above description and the related figures are only intended to illustrate the present invention. Different variations and modifications of the invention without deviation from the scope of the invention will be obvious to a person skilled in the art.

The invention claimed is:

1. A valve, comprising
a housing whose wall has an inner surface curving around an axis of rotation and which joins together a first part and a second part of a flow channel, of which at least the first part or the second part is connected to the housing via an opening in the wall of the housing,
a closing member arranged in the housing and a shaft protruding from the closing member by which the closing member is rotatable in the housing around said axis of rotation between a position covering the opening and a position uncovering the opening, said closing member including
a sector closing the opening,
a guiding cylindrical sector in contact with the housing wall to position the closing member relative to the housing,
a flexible sector having a wall thinner than a wall of the closing sector and a wall of the guiding cylindrical sector, the guiding cylindrical sector being joined to the closing sector via the flexible sector only, and
an open sector that is a void extending from a bottom of the closing member to completely separate the closing sector from the guiding cylindrical sector.

2. A valve according to claim 1, wherein said housing is formed of a sleeve attached to the valve.

3. A valve according to claim 1, wherein one end of the housing has an opening for connecting the housing to the first part or the second part of the flow channel.

4. A valve according to claim 1, wherein said guiding cylindrical sector is opposite to the closing sector relative to the axis of rotation.

5. A valve according to claim 1, wherein the housing is of a cylindrical shape.

6. A valve according to claim 1, wherein an outer surface of the closing sector and the inner surface of the housing wall have the same radius at each location along the axis of rotation.

7. A valve according to claim 1, wherein an outer surface of the guiding cylindrical sector and the inner surface of the housing wall have the same radius at each location along the axis of rotation.

8. A valve according to claim 1, wherein the closing member is provided with an attaching part for receiving said shaft, the attaching part being attached to at least the closing sector of the closing member and separated from the guiding cylindrical sector with a slot.

9. A valve according to claim 1, wherein the shaft is joined to the closing member via the closing sector.

10. A valve according to claim 9, wherein the shaft is separated from the guiding cylindrical sector of the closing member with a slot.

* * * * *